(12) United States Patent
Zhang et al.

(10) Patent No.: US 10,511,374 B2
(45) Date of Patent: Dec. 17, 2019

(54) SYSTEM AND METHOD FOR CONTROL CHANNEL BEAM ASSUMPTION

(71) Applicant: INTEL IP CORPORATION, Santa Clara, CA (US)

(72) Inventors: Yushu Zhang, Beijing (CN); Yuan Zhu, Beijing (CN); Wenting Chang, Beijing (CN); Gang Xiong, Beavertion, OR (US); Huaning Niu, Milpitas, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/067,806

(22) PCT Filed: Jun. 28, 2016

(86) PCT No.: PCT/CN2016/087474
§ 371 (c)(1),
(2) Date: Jul. 2, 2018

(87) PCT Pub. No.: WO2017/133173
PCT Pub. Date: Aug. 10, 2017

(65) Prior Publication Data
US 2019/0028176 A1    Jan. 24, 2019

(30) Foreign Application Priority Data

Feb. 1, 2016  (WO) ................ PCT/CN2016/073104

(51) Int. Cl.
*H04B 7/10*  (2017.01)
*H04B 7/06*  (2006.01)
(Continued)

(52) U.S. Cl.
CPC ............. *H04B 7/10* (2013.01); *H04B 7/0617* (2013.01); *H04B 7/0626* (2013.01);
(Continued)

(58) Field of Classification Search
CPC .......... H04B 7/10; H04B 7/08; H04B 7/0408; H04B 7/04; H04B 7/0608
See application file for complete search history.

(56) References Cited

U.S. PATENT DOCUMENTS 9,871,573 B2    1/2018  Sun et al.
2012/0051257 A1   3/2012  Kim et al.
(Continued)

FOREIGN PATENT DOCUMENTS

CN    103095400    5/2013

OTHER PUBLICATIONS

International Preliminary Report on Patentability for International Patent Application No. PCT/CN16/87474, dated Aug. 16, 2018.
(Continued)

*Primary Examiner* — Kevin Kim
(74) *Attorney, Agent, or Firm* — Green, Howard & Mughal LLP.

(57) ABSTRACT

Described is an apparatus of an Evolved Node-B (eNB) comprising a first circuitry, a second circuitry, and a third circuitry. The first circuitry may be operable to generate a reference signal transmission for an eNB Transmitting (Tx) beam corresponding with at least a first eNB antenna port having a first polarization and a second eNB antenna port having a second polarization. The second circuitry may be operable to process one or more reporting transmissions carrying at least one of a first signal reception indication for a first UE antenna port and a second signal reception indication for a second UE antenna port. The third circuitry may be operable to determine a transmission hypothesis based upon the one or more reporting transmissions.

24 Claims, 9 Drawing Sheets

(51) Int. Cl.
*H04L 5/00* (2006.01)
*H04W 88/02* (2009.01)
*H04W 88/08* (2009.01)
*H04W 84/04* (2009.01)

(52) U.S. Cl.
CPC .......... *H04L 5/0023* (2013.01); *H04L 5/0048* (2013.01); *H04W 84/045* (2013.01); *H04W 88/02* (2013.01); *H04W 88/08* (2013.01)

(56) References Cited

U.S. PATENT DOCUMENTS

| | | |
|---|---|---|
| 2013/0230081 A1 | 9/2013 | Wernersson et al. |
| 2014/0105057 A1 | 4/2014 | Liu |
| 2014/0241193 A1 | 8/2014 | Sun et al. |
| 2015/0207549 A1* | 7/2015 | Nagata .................. H01Q 1/246 370/252 |
| 2016/0183275 A1* | 6/2016 | Inoue .................. H04B 7/0695 455/450 |

OTHER PUBLICATIONS

International Search Report and Written Opinion for International Patent Application No. PCT/US2016/087474, dated Oct. 28, 2016.
Ericsson, et al., "On Feedback in Support of DL Multi-Antenna Transmission", 3 GPP TSG-RAN WG1 #59, R1-094442 03, Nov. 3, 2009.

* cited by examiner

SYSTEM AND METHOD FOR CONTROL CHANNEL BEAM ASSUMPTION

CLAIM OF PRIORITY

The present application is a National Stage Entry of, and claims priority to, Patent Cooperation Treaty International Patent Application Number PCT/CN2016/087474, filed on Jun. 28, 2016 and entitled "System and Method for Control Channel Beam Assumption", which claims priority under 35 U.S.C. § 365(c) to Patent Cooperation Treaty International Patent Application Number PCT/CN2016/073104 filed Feb. 1, 2016 and entitled "Control Channel Beam Assumption In Antenna Port Selection," both of which are herein incorporated by reference in their entireties.

BACKGROUND

Various wireless cellular communication systems have been implemented, including a 3rd Generation Partnership Project (3GPP) Universal Mobile Telecommunications System, a 3GPP Long-Term Evolution (LTE) system, and a 3GPP LTE-Advanced (LTE-A) system. Next-generation wireless cellular communication systems based upon LTE and LTE-A systems are being developed, such as a fifth generation (5G) wireless system/5G mobile networks system. Next-generation systems may provide support for higher bandwidths in part by supporting higher carrier frequencies, such as centimeter-wave (cmWave) and millimeter-wave (mmWave) frequencies. Meanwhile, due to path loss associated with cmWave and mmWave frequencies, next-generation systems may support antenna structures to enable Multiple Input and Multiple Output (MIMO) based beamforming.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Figure 1:
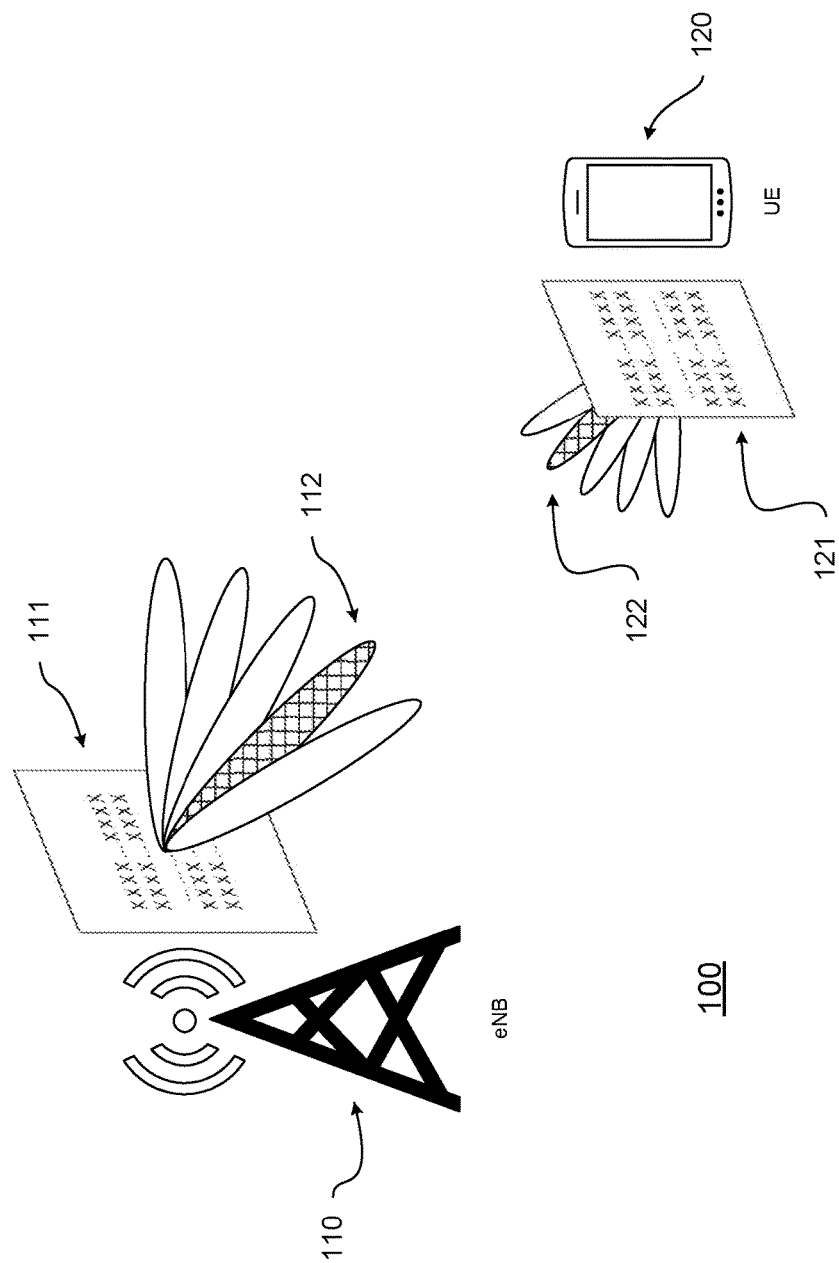
FIG. 1 illustrates an Evolved Node-B (eNB) and a User Equipment (UE) with antenna array structures implementing beamforming, in accordance with some embodiments of the disclosure.

Various wireless cellular communication systems have been implemented, including a 3rd Generation Partnership Project (3GPP) Universal Mobile Telecommunications System, a 3GPP Long-Term Evolution (LTE) system, and a 3GPP LTE-Advanced (LTE-A) system. Meanwhile, next-generation wireless cellular communication systems are being developed, including a fifth generation (5G) wireless system/5G mobile networks system based upon (and extending) LTE systems and LTE-A systems.

Next-generation systems may provide support for higher bandwidths in part by supporting higher carrier frequencies, such as centimeter-wave (cmWave) and millimeter-wave (mmWave) frequencies. Meanwhile, such systems may support antenna structures implementing Multiple Input and Multiple Output (MIMO) based beamforming to counteract path loss associated with cmWave and mmWave frequencies. Multiple antenna ports may be employed to send or receive a beamformed transmission. In some situations, there may be advantages for an eNB and a UE to have corresponding expectations regarding the number of antenna ports used to transmit or receive a beamformed transmission.

Disclosed herein are various structures and methods related to establishing and determining transmission hypotheses for MIMO-based beamforming antennas, such as transmission hypotheses that may be used for control channel transmissions. In some embodiments, a User Equipment (UE) may establish a transmission hypothesis, and an Evolved Node-B (eNB) may determine the transmission hypothesis on the basis of Beam Reference Signal (BRS) Receiving Power (BRS-RP) report returned by the UE. In some embodiments, a UE may establish a transmission hypothesis, and an eNB may determine the transmission hypothesis on the basis of a reported Channel Quality Indicator (CQI) report returned by the UE. In some embodiments, a UE may establish a transmission hypothesis on the basis of a Downlink Control Information (DCI) transmission from an eNB.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

In addition, for purposes of the present disclosure, the term "eNB" may refer to a legacy (e.g., LTE and/or LTE-A) eNB, a next-generation or 5G eNB, an mmWave eNB, an mmWave small cell, an AP, and/or another base station for a wireless communication system. For purposes of the present disclosure, the term "UE" may refer to a legacy (e.g., LTE and/or LTE-A) UE, a 5G UE, an mmWave UE, an STA, and/or another mobile equipment for a wireless communication system.

Various embodiments of eNBs and/or UEs discussed below may process one or more transmissions of various types. Some processing of a transmission may comprise demodulating, decoding, detecting, parsing, and/or otherwise handling a transmission that has been received. In some embodiments, an eNB or UE processing a transmission may determine or recognize the transmission's type and/or a condition associated with the transmission. For some embodiments, an eNB or UE processing a transmission may act in accordance with the transmission's type, and/or may act conditionally based upon the transmission's type. An eNB or UE processing a transmission may also recognize one or more values or fields of data carried by the transmission. Processing a transmission may comprise moving the transmission through one or more layers of a protocol stack (which may be implemented in, e.g., hardware and/or software-configured elements), such as by moving a transmission that has been received by an eNB or a UE through one or more layers of a protocol stack.

Various embodiments of eNBs and/or UEs discussed below may also generate one or more transmissions of various types. Some generating of a transmission may comprise modulating, encoding, formatting, assembling, and/or otherwise handling a transmission that is to be transmitted. In some embodiments, an eNB or UE generating a transmission may establish the transmission's type and/or a condition associated with the transmission. For some embodiments, an eNB or UE generating a transmission may act in accordance with the transmission's type, and/or may act conditionally based upon the transmission's type. An eNB or UE generating a transmission may also determine one or more values or fields of data carried by the transmission. Generating a transmission may comprise moving the transmission through one or more layers of a protocol stack (which may be implemented in, e.g., hardware and/or software-configured elements), such as by moving a transmission to be sent by an eNB or a UE through one or more layers of a protocol stack.

In some embodiments, MIMO-based beamforming may be supported by arrays of antennas or antenna elements. Some embodiments may employ two-dimensional (2D) antenna arrays. FIG. 1 illustrates an Evolved Node-B (eNB) and a User Equipment (UE) with antenna array structures implementing beamforming, in accordance with some embodiments of the disclosure. A MIMO-based beamforming system 100 may comprise an eNB 110 and a UE 120.

eNB 110 may comprise one or more antenna arrays 111, each of which may be a 2D antenna array. An antenna array 111 may in turn implement MIMO-based beamforming operable to support one or more Transmitting (Tx) beams 112. An antenna array 111 may also support one or more Receiving (Rx) beams, which may respectively correspond with Tx beams 112, and may be oriented in directions substantially similar to Tx beams 112. In some embodiments, Tx beams 112 of antenna array 111 and the Rx beams of antenna array 111 may be calibrated for directional reciprocity.

UE 120 may comprise one or more antenna arrays 121, which may be a 2D antenna array. An antenna array 121 may in turn implement MIMO-based beamforming operable to support one or more Tx beams 122. An antenna array 121 may also support one or more Rx beams, which may respectively correspond with Tx beams 122, and may be oriented in directions substantially similar to Tx beams 122.

In some embodiments, Tx beams 122 of antenna array 121 and the Rx beams of antenna array 121 may be calibrated for directional reciprocity.

Figure 2:
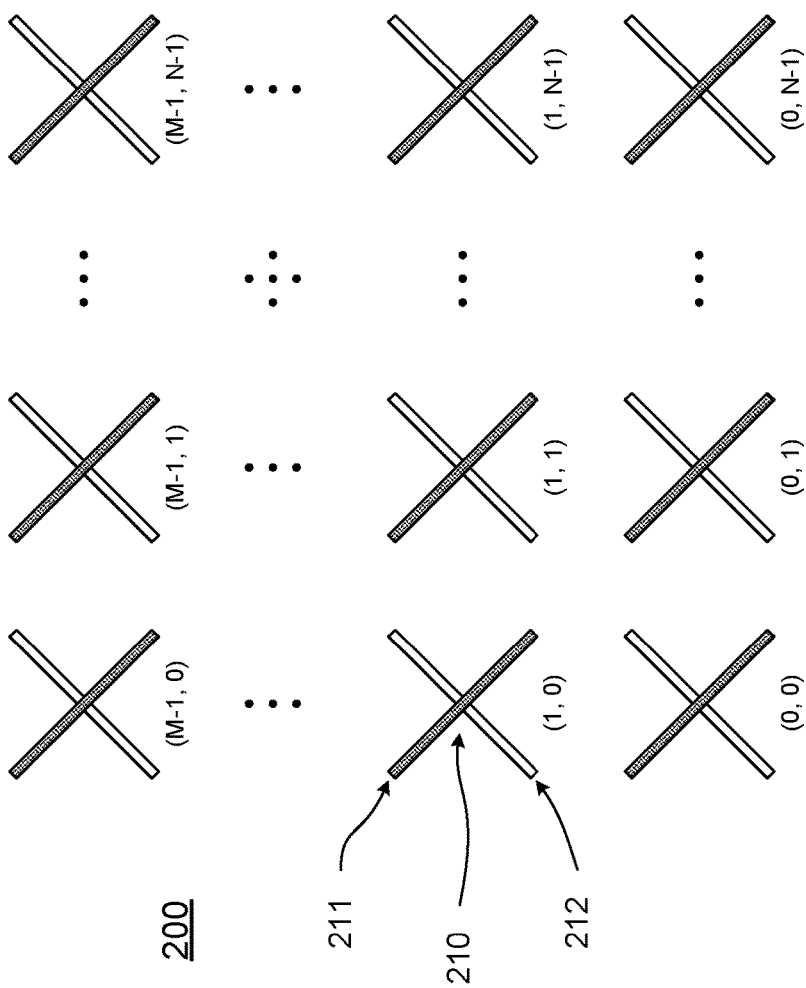
FIG. 2 illustrates a two-dimensional (2D) antenna array structure, in accordance with some embodiments of the disclosure.

FIG. 2 illustrates a 2D antenna array structure, in accordance with some embodiments of the disclosure. An antenna array 200 may comprise a plurality of antenna element pairs 210, which may in turn be categorized or arranged in M groups of a first dimension (e.g., groups in M rows) and in N groups of a second dimension (e.g., groups in N columns). Each antenna element pair may comprise a first antenna element 211 having a first polarization (e.g., a horizontal polarization) and a second antenna element 212 having a second polarization (e.g., a vertical polarization).

Either an eNB (such as eNB 110), or a UE (such as UE 120), or both may be equipped with one or more antenna arrays like antenna array 200. For example, in some embodiments, an eNB and/or a UE may be equipped with four 2D antenna arrays such as antenna array 200.

Within antenna array 200, one or more antenna elements of the same polarization may be virtualized into a single digital antenna port. Such virtualization may be used to support analog beamforming. Antenna array 200 may accordingly comprise one or more antenna elements having the first polarization virtualized into a first digital antenna port, and one or more antenna elements having the second polarization virtualized into a second digital antenna port.

The first digital antenna port and the second digital antenna port may have beamforming weights, which may reflect relative signal strengths. In some embodiments, the first digital antenna port and the second digital antenna port may have the same beamforming weight. In some embodiments, the first digital antenna port and the second digital antenna port may have different beamforming weights.

A Tx beam may be transmitted by two antenna ports having different polarizations. In some cases, for rank two transmission, an eNB may be operable to transmit a Tx beam via antenna ports having the same beamforming weights, which may be suitable for a Line-of-Sight (LoS) channel condition. In some cases, for rank two transmission, an eNB may be operable to transmit via antenna ports having different beamforming weights, which may be suitable for a non-LoS channel condition.

Meanwhile, one the UE side, a receiving power for a Tx beam component of one polarization may be much higher than a receiving power for a Tx beam of another polarization. In some cases, a UE may simply be unable to receive a Tx beam component of a particular polarization. Under such conditions, it may be desirable for the UE to utilize one antenna port instead of two antenna ports.

However, for a UE to take advantage of single-polarity communication (e.g., single-polarity reception and/or transmission), an eNB communicating with the UE should account for whether the UE is expecting single-polarity transmissions or two-polarity transmissions for a Tx beam. For example, under a first transmission hypothesis, a UE may establish or otherwise expect two-polarity transmissions for the Tx beam, while under a second transmission hypothesis, a UE may establish or otherwise expect single-polarity transmissions for the Tx beam. An eNB may then determine which transmission hypothesis the UE may use. Subsequently, the eNB may adjust beamforming weights for various antenna ports contributing to the Tx beam.

There may be different transmission hypotheses for the same transmission rank. For rank two transmissions, there may be two different transmission hypotheses. Adapting between different transmission hypotheses with the same transmission ranks, for both data channels and control channels, may be advantageous.

The transmission hypothesis established by a UE may be significant for an eNB to account for in various situations. A UE may need to report BSR-RP and/or CQI as measured from either an antenna port of one polarization or antenna ports of two polarizations. In addition, for control channel transmissions, a Control Channel Element (CCE) index may depend upon the antenna port (or ports) used for the control channel transmission.

In some embodiments, a transmission hypothesis established by a UE (and/or subsequently determined by an eNB) may be reflected in BRS-RP reporting. In various embodiments, a UE may report a BRS-RP based upon one or more BRS transmissions from an eNB, in which different Tx beams may be applied to different BRS sequences. For example, one BRS sequence in one subframe may be transmitted by one antenna port, and the two polarizations may be transmitted alternatively. BRS-RP may accordingly be antenna-port-specific. In various embodiments, when a UE reports BRS-RP, the UE may report number of the subframe in which BRS-RP was obtained, a BRS-RP value, and/or a BRS ID which may be used to indicate a beam index.

On the UE side, a BRS-RP value of a beam j measured from an antenna port i (where i∈[0,1]) may be represented as $\gamma_i^j$. In some embodiments, a UE may establish a transmission hypothesis (e.g., for a control channel) as indicating two antenna ports when equation 1 below is satisfied:

$$|\gamma_0^k - \gamma_1^k| < \Delta \qquad (1)$$

Where:

k may be a beam index corresponding with a largest BRS-RP reported; and

Δ may be a threshold pre-defined by the system or configured by higher layer signaling.

A UE may establish a transmission hypothesis as indicating either two antenna ports on one antenna port based upon signal reception indications for a first UE antenna port and a second UE antenna port. The UE may then report BRS-RP to an eNB. Based upon the reported BRS-RP, the eNB may be able to determine which transmission hypothesis a UE has established, and may also determine which beam may be a best beam for a UE. In some embodiments, the UE may also prepare an Rx beam matched to the Tx beam k for receiving control channel transmissions.

In some embodiments, whether the UE establishes a transmission hypothesis as indicating two antenna ports, or whether the UE establishes a transmission hypothesis as indicating one antenna port, the UE may establish a Tx beam k corresponding with a highest BRS-RP to be a Tx beam for control channel transmissions. In some embodiments, a UE may establish a Tx beam corresponding with a highest CQI (as measured based upon a Channel State Information (CSI) Reference Signal (CSI-RS)) to be a Tx beam for control channel transmissions.

Figure 3:
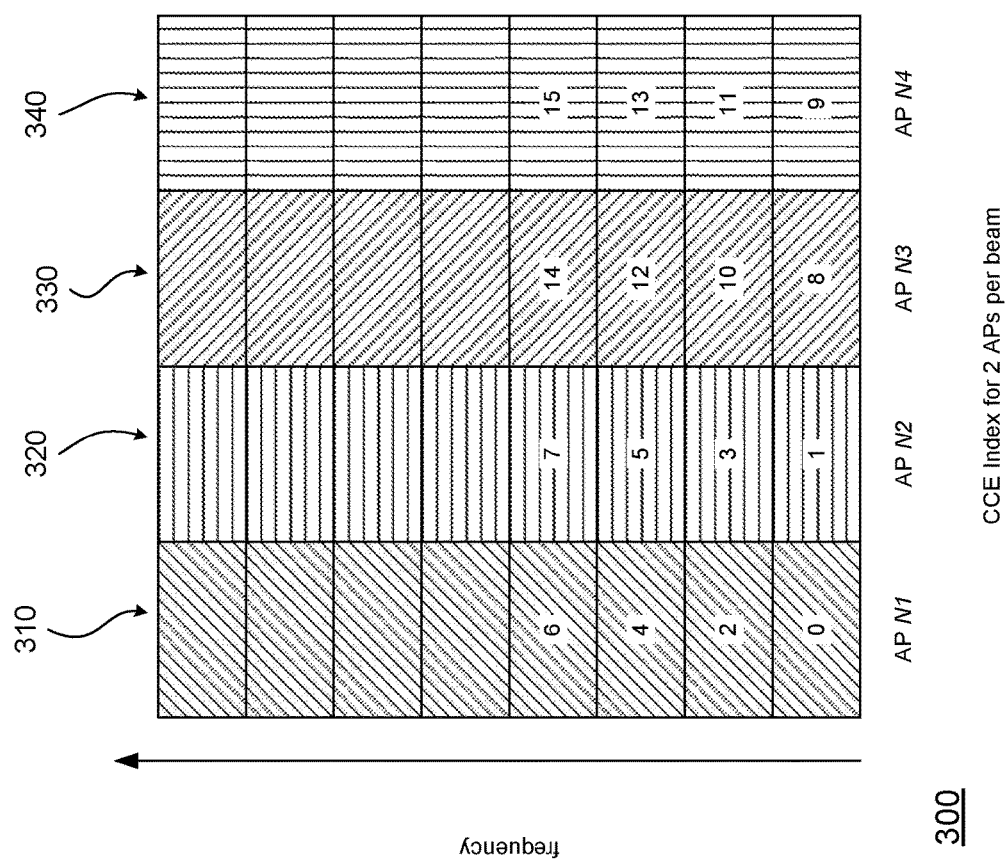
FIG. 3 illustrates a Control Channel Element (CCE) index assumption, in accordance with some embodiments of the disclosure.

FIG. 3 illustrates a Control Channel Element (CCE) index assumption, in accordance with some embodiments of the disclosure. A CCE index map 300 may comprise a map of CCE indices across antenna ports and frequencies. Map 300 may comprise a first set of CCE indices 310 for a first antenna port, a second set of CCE indices 320 for a second antenna port, a third set of CCE indices 330 for a third antenna port, and a fourth set of CCE indices 340 for a fourth antenna port.

The CCE indices may depend upon the antenna ports, and as a result, different CCE index patterns may occur when different antenna ports are used. For example, some embodiments may have two antenna ports (APs) per beam. In some such embodiments, CCE indices may be consecutive across the two antenna ports. In another example, some embodiments may have one antenna port per beam. In some such embodiments, the single antenna port of the beam may be used to send a control channel transmission.

For embodiments having more than one antenna port per beam, the selected antenna port for a beam may be the antenna port having the largest BRS-RP. In some embodiments, in one BRS subframe, one antenna port may be used by one beam, and two antenna ports may be used alternatively. An index of antenna ports may be determined by a subframe index. For example, a BRS may be transmitted in subframes 0 and 25 in one frame. An odd antenna port may be used for the BRS transmitted in subframe 0, and an even antenna port may be used for the BRS transmitted in subframe 25.

With respect to FIG. 3., in a two antenna port case, a UE may search CCE's in order from CCE 0 to CCE 15. In a one antenna port case, a UE may search odd CCEs, or a UE may search even CCEs. Whether the odd CCEs or even CCEs are searched may be determined by the selected antenna port. For example, if a first polarization is used, a UE's search space may be 2x, where x may be determined in accordance with equation 2 below:

$$x = N_{CCE,start}, N_{CCE,start}+1, \ldots, N_{CCE,start}+M \quad (1)$$

And where:

M may be a number of CCEs for the UE.

In some embodiments, a transmission hypothesis established by a UE (and/or subsequently determined by an eNB) may be reflected in CQI reporting. The CSI-RS may be divided into a number $N_{CRG}$ of CSI-RS Groups (CRGs). Each CRG may contain two antenna ports and may be transmitted with different Transmitting (Tx) beams.

For a CSI-RS measurement related to one CRG j, a UE may measure three types of CQI. A first type of CQI may be measured from a first antenna port $P_1^j$. A second type of CQI may be measured from a second antenna port $P_2^j$. A third type of CQI may be measured from both the first antenna port and the second antenna port $\{P_1^j, P_2^j\}$. The CQI corresponding with the highest spectrum efficiency may be selected and used for establishing a transmission hypothesis.

For some embodiments, a reported CQI for one CRG may comprise information such as a Channel Quality Indicator (CQI), a CRG group index, and/or an Antenna Port and Rank Indicator (APRI). The APRI may be used for antenna port selection and rank indication.

Table 1 below shows one example for a two-bit APRI, in which the type of CQI being reported (which relates to the antenna port or antenna ports from which CSI is obtained) can be indicated. The CQI and CRG group index may be measured based on the type of CQI being reported as indicated by the APRI.

TABLE 1 one example for 2-bit APRI Indication for a CRGj

| APRI Value | Antenna Port | Rank |
|---|---|---|
| 0 | $P_1^j$ | 1 |
| 1 | $P_2^j$ | 1 |
| 2 | $\{P_1^j, P_2^j\}$ | 1 |
| 3 | $\{P_1^j, P_2^j\}$ | 2 |

In some embodiments, a transmission hypothesis may be established by a UE in accordance with instructions from an eNB. An eNB may indicate a number of antenna ports to be measured for one or more CRGs via Downlink Control Information (DCI) or higher layer signaling. If only one antenna port is enabled for CQI measurement, the APRI may be used to indicate the antenna port index. If two antenna ports are enabled for CQI measurement, the APRI may be used to indicate a Rank Indicator (RI).

For some embodiments, new information of a measured antenna port may be added to a Beam Search Algorithm (BSA) indicator. The new information may be used to indicate which antenna port or antenna ports should be used to measure CQI. For example, a first value of the BSA indicator may indicate that a first antenna port in a CRG may be used to measure CQI, a second value of the BSA indicator may indicate that a second antenna port in the CRG may be used to measure CQI, and a third value of the BSA indicator may indicate that both the first antenna port and the second antenna port in the CRG may be used to measure CQI. In another example, one value of the BSA indicator may indicate that one antenna port in the CRG may be used to measure CQI, and a second value of the BSA indicator may indicate that two antenna ports in the CRG may be used to measure CQI.

Figure 4:
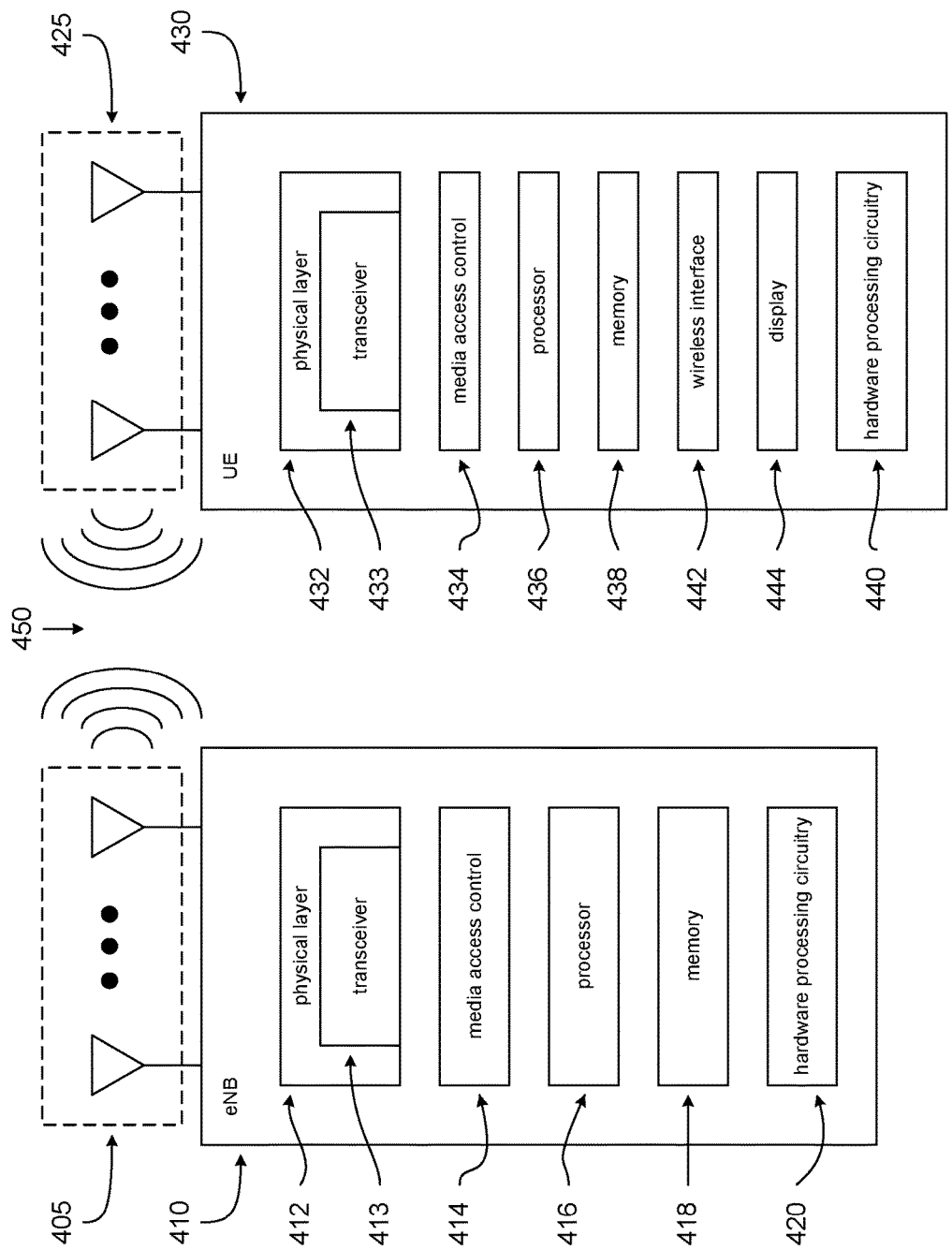
FIG. 4 illustrates an eNB and a UE, in accordance with some embodiments of the disclosure.

FIG. 4 illustrates an eNB and a UE, in accordance with some embodiments of the disclosure. FIG. 4 includes block diagrams of an eNB 410 and a UE 430 which are operable to co-exist with each other and other elements of an LTE network. High-level, simplified architectures of eNB 410 and UE 430 are described so as not to obscure the embodiments. It should be noted that in some embodiments, eNB 410 may be a stationary non-mobile device.

eNB 410 is coupled to one or more antennas 405, and UE 430 is similarly coupled to one or more antennas 425. However, in some embodiments, eNB 410 may incorporate or comprise antennas 405, and UE 430 in various embodiments may incorporate or comprise antennas 425.

In some embodiments, antennas 405 and/or antennas 425 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO (multiple-input and multiple output) embodiments, antennas 405 are separated to take advantage of spatial diversity.

eNB 410 and UE 430 are operable to communicate with each other on a network, such as a wireless network. eNB 410 and UE 430 may be in communication with each other over a wireless communication channel 450, which has both a downlink path from eNB 410 to UE 430 and an uplink path from UE 430 to eNB 410.

As illustrated in FIG. 4, in some embodiments, eNB 410 may include a physical layer circuitry 412, a MAC (media access control) circuitry 414, a processor 416, a memory 418, and a hardware processing circuitry 420. A person skilled in the art will appreciate that other components not shown may be used in addition to the components shown to form a complete eNB.

In some embodiments, physical layer circuitry 412 includes a transceiver 413 for providing signals to and from UE 430. Transceiver 413 provides signals to and from UEs or other devices using one or more antennas 405. In some embodiments, MAC circuitry 414 controls access to the wireless medium. Memory 418 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Hardware processing circuitry 420 may comprise logic devices or circuitry to perform various operations. In some embodiments, processor 416 and memory 418 are arranged to perform the operations of hardware processing circuitry 420, such as operations described herein with reference to logic devices and circuitry within eNB 410 and/or hardware processing circuitry 420.

Accordingly, in some embodiments, eNB 410 may be a device comprising an application processor, a memory, one or more antenna ports, and an interface for allowing the application processor to communicate with another device.

As is also illustrated in FIG. 4, in some embodiments, UE 430 may include a physical layer circuitry 432, a MAC circuitry 434, a processor 436, a memory 438, a hardware processing circuitry 440, a wireless interface 442, and a display 444. A person skilled in the art would appreciate that other components not shown may be used in addition to the components shown to form a complete UE.

In some embodiments, physical layer circuitry 432 includes a transceiver 433 for providing signals to and from eNB 410 (as well as other eNBs). Transceiver 433 provides signals to and from eNBs or other devices using one or more antennas 425. In some embodiments, MAC circuitry 434 controls access to the wireless medium. Memory 438 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Wireless interface 442 may be arranged to allow the processor to communicate with another device. Display 444 may provide a visual and/or tactile display for a user to interact with UE 430, such as a touch-screen display. Hardware processing circuitry 440 may comprise logic devices or circuitry to perform various operations. In some embodiments, processor 436 and memory 438 may be arranged to perform the operations of hardware processing circuitry 440, such as operations described herein with reference to logic devices and circuitry within UE 430 and/or hardware processing circuitry 440.

Accordingly, in some embodiments, UE 430 may be a device comprising an application processor, a memory, one or more antennas, a wireless interface for allowing the application processor to communicate with another device, and a touch-screen display.

Elements of FIG. 4, and elements of other figures having the same names or reference numbers, can operate or function in the manner described herein with respect to any such figures (although the operation and function of such elements is not limited to such descriptions). For example, FIGS. 5 and 6 also depict embodiments of eNBs, hardware processing circuitry of eNBs, UEs, and/or hardware processing circuitry of UEs, and the embodiments described with respect to FIG. 4 and FIGS. 5 and 6 can operate or function in the manner described herein with respect to any of the figures.

In addition, although eNB 410 and UE 430 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), and so on.

An eNB may include various hardware processing circuitries discussed below (such as hardware processing circuitry 500 of FIG. 5), which may in turn comprise logic devices and/or circuitry operable to perform various operations. For example, with reference to FIG. 4, eNB 410 (or various elements or components therein, such as hardware processing circuitry 420, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 416 (and/or one or more other processors which eNB 410 may comprise), memory 418, and/or other elements or components of eNB 410 (which may include hardware processing circuitry 420) may be arranged to perform the operations of these hardware processing circuitries, such as operations described herein with reference to devices and circuitry within these hardware processing circuitries. In some embodiments, processor 416 (and/or one or more other processors which eNB 410 may comprise) may be a baseband processor.

A UE may include various hardware processing circuitries discussed below (such as hardware processing circuitry 600 of FIG. 6), which may in turn comprise logic devices and/or circuitry operable to perform various operations. For example, with reference to FIG. 4, UE 430 (or various elements or components therein, such as hardware processing circuitry 440, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 436 (and/or one or more other processors which UE 430 may comprise), memory 438, and/or other elements or components of UE 430 (which may include hardware processing circuitry 440) may be arranged to perform the operations of these hardware processing circuitries, such as operations described herein with reference to devices and circuitry within these hardware processing circuitries. In some embodiments, processor 436 (and/or one or more other processors which UE 430 may comprise) may be a baseband processor.

Figure 7:
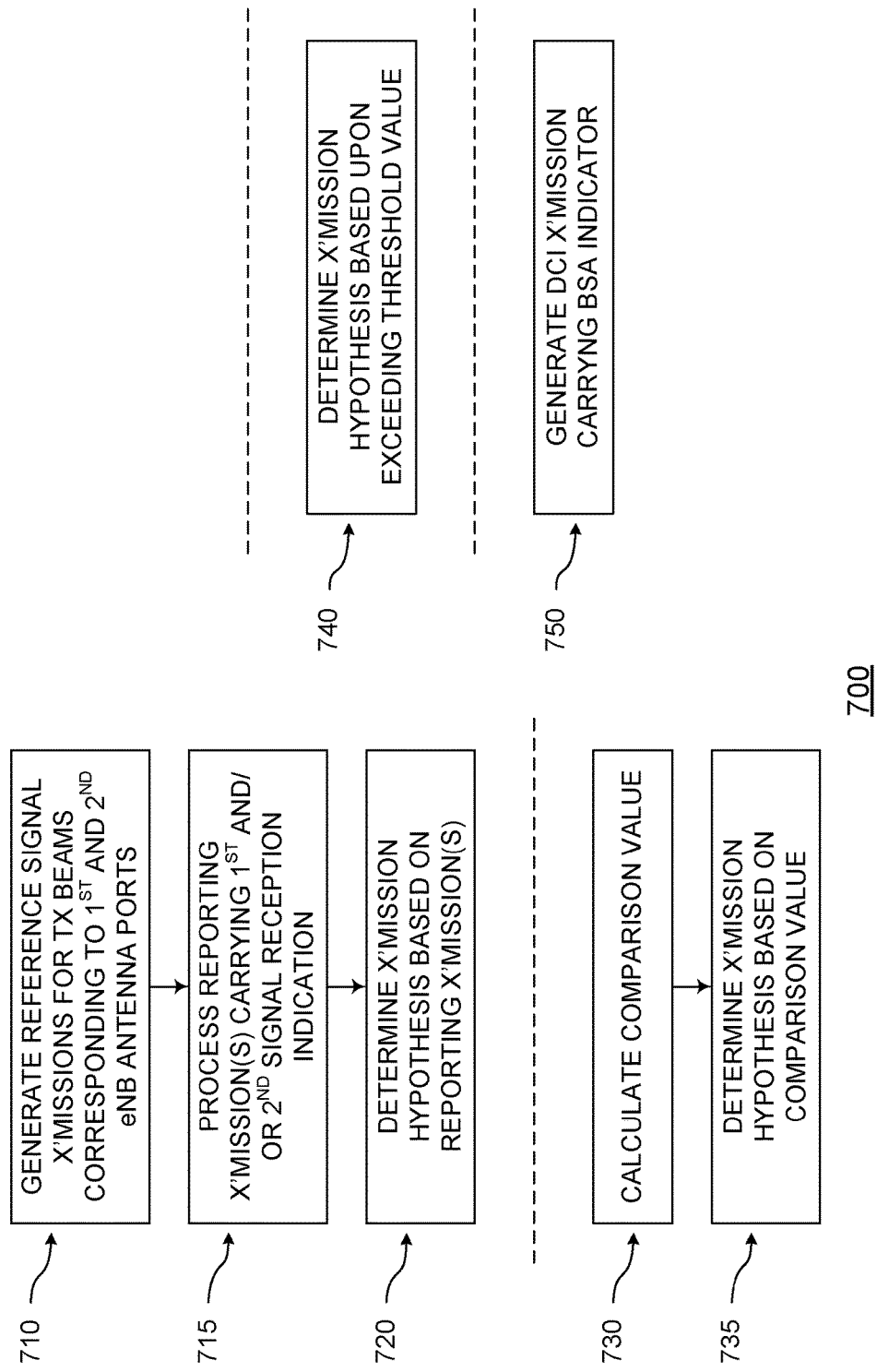
FIG. 7 illustrates methods for an eNB for determining beamforming hypotheses, in accordance with some embodiments of the disclosure.

Various methods that may relate to eNB 410 and hardware processing circuitry 420 are discussed below. Although the actions in flowchart 700 with reference to FIG. 7 are shown in a particular order, the order of the actions can be modified. Thus, the illustrated embodiments can be performed in a different order, and some actions may be performed in parallel. Some of the actions and/or operations listed in FIG. 7 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause eNB 410 and/or hardware processing circuitry 420 to perform an operation comprising the methods of FIG. 7. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIG. 7.

Figure 8:
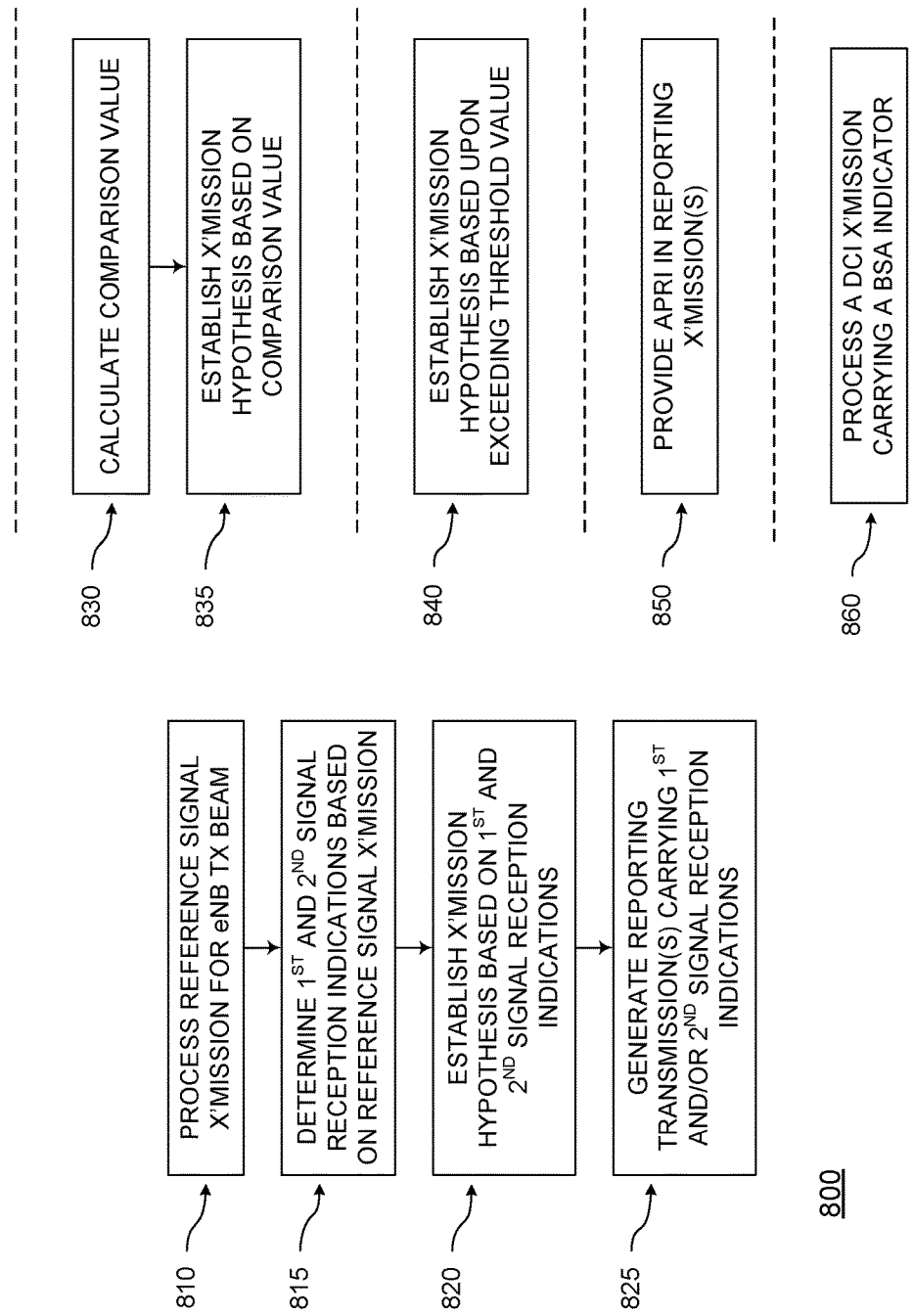
FIG. 8 illustrates methods for a UE for establishing beamforming hypotheses, in accordance with some embodiments of the disclosure.

Various methods that may relate to UE 430 and hardware processing circuitry 440 are discussed below. Although the actions in the flowchart 800 with reference to FIG. 8 are shown in a particular order, the order of the actions can be modified. Thus, the illustrated embodiments can be performed in a different order, and some actions may be performed in parallel. Some of the actions and/or operations listed in FIG. 8 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause UE 430 and/or hardware processing circuitry 440 to perform an operation comprising the methods of FIG. 8. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIG. 8.

Figure 5:
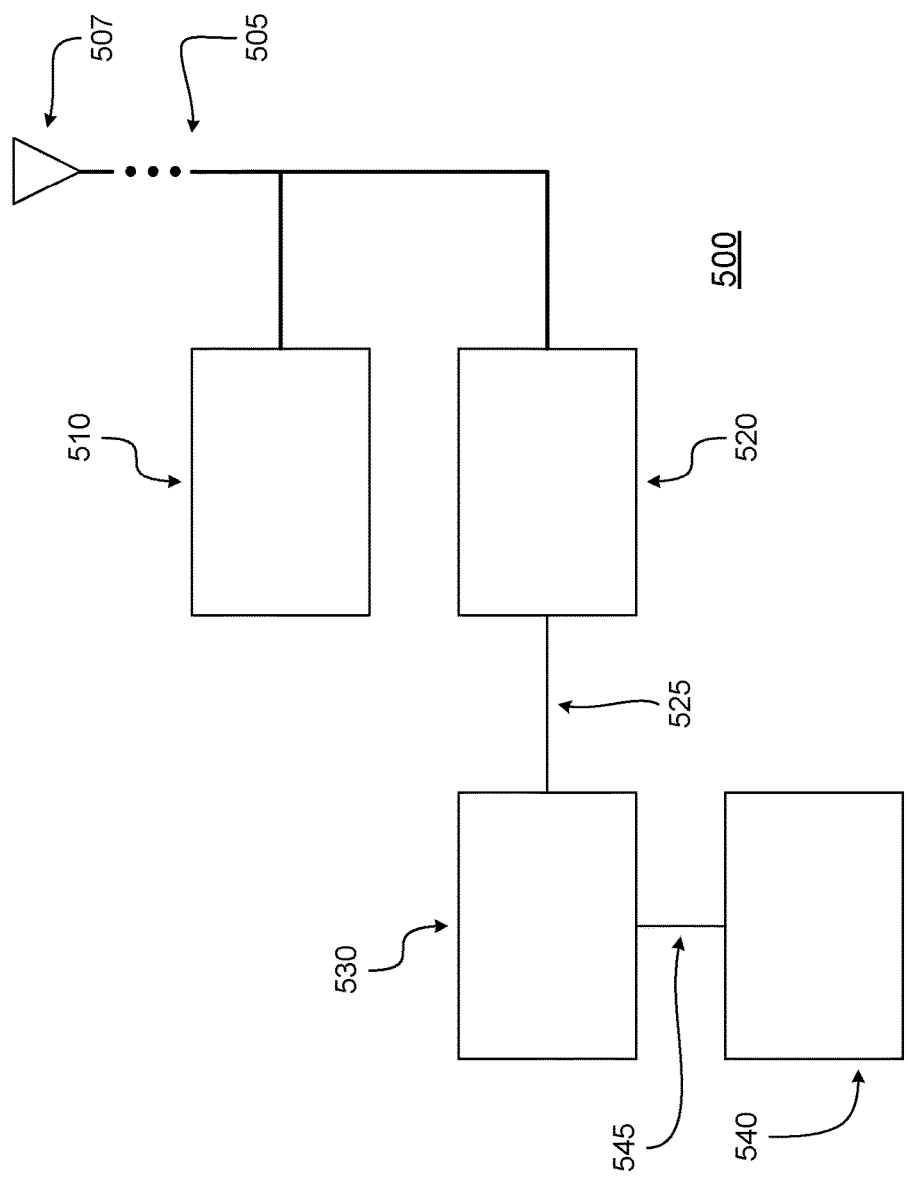
FIG. 5 illustrates hardware processing circuitries for an eNB for determining beamforming hypotheses, in accordance with some embodiments of the disclosure.

FIG. 5 illustrates hardware processing circuitries for an eNB for determining beamforming hypotheses, in accordance with some embodiments of the disclosure. An apparatus of eNB 410 (or another eNB or base station), which may be operable to communicate with one or more UEs on a wireless network, may comprise hardware processing circuitry 500. In some embodiments, hardware processing circuitry 500 may comprise one or more antenna ports 505 operable to provide various transmissions over a wireless communication channel (such as wireless communication channel 450). Antenna ports 505 may be coupled to one or more antennas 507 (which may be antennas 405). In some embodiments, hardware processing circuitry 500 may incorporate antennas 507, while in other embodiments, hardware processing circuitry 500 may merely be coupled to antennas 507.

Antenna ports 505 and antennas 507 may be operable to provide signals from an eNB to a wireless communications channel and/or a UE, and may be operable to provide signals from a UE and/or a wireless communications channel to an eNB. For example, antenna ports 505 and antennas 507 may be operable to provide transmissions from eNB 410 to wireless communication channel 450 (and from there to UE 430, or to another UE). Similarly, antennas 507 and antenna ports 505 may be operable to provide transmissions from a wireless communication channel 450 (and beyond that, from UE 430, or another UE) to eNB 410.

With reference to FIG. 5, hardware processing circuitry 500 may comprise a first circuitry 510, a second circuitry 520, a third circuitry 530, and a fourth circuitry 540. First circuitry 510 may be operable to generate a reference signal transmission for an eNB Tx beam corresponding with at least a first eNB antenna port having a first polarization and a second eNB antenna port having a second polarization. Second circuitry 520 may be operable to process one or more reporting transmissions carrying at least one of a first signal reception indication for a first UE antenna port and a second signal reception indication for a second UE antenna port. Second circuitry 520 may provide the one or more reporting transmissions to third circuitry 530 via an interface 525. Third circuitry 530 may be operable to determine a transmission hypothesis based upon the one or more reporting transmissions.

In some embodiments, the reference signal transmission may comprise one or more BRSes. For some embodiments, the first signal reception indication may comprise a first BRS-RP corresponding with the first UE antenna port. In some embodiments, the second signal reception indication may comprise a second BRS-RP corresponding with the second UE antenna port.

For some embodiments, fourth circuitry 540 may be operable to calculate a comparison value as being an absolute value of a difference between the first BRS-RP and the second BRS-RP. Fourth circuitry 540 may be operable to transmit the comparison value to third circuitry 530 via an interface 545. In some such embodiments, third circuitry 530 may be operable to determine the transmission hypothesis as indicating two UE antenna ports if the comparison value is less than a predetermined threshold value. For some embodiments, third circuitry 530 may be operable to determine the transmission hypothesis as indicating two UE antenna ports if both the first BRS-RP and the second BRS-RP exceed a predetermined threshold value.

In some embodiments, the first signal reception indication may comprise a first CQI. For some embodiments, the second signal reception indication may comprise a second CQI. In some embodiments, the one or more reporting transmissions may carry an APRI. For some embodiments, the APRI may be operable to have one or more values indicating whether the first UE antenna port is enabled. In some embodiments, the APRI may be operable to have one or more values indicating whether the second UE antenna port is enabled.

For some embodiments, first circuitry 510 may be operable to generate a DCI transmission carrying a BSA indicator. In some such embodiments, the BSA indicator may be operable to have one or more values to enable the first UE antenna port, and the BSA indicator may be operable to have one or more values to enable the second UE antenna port.

In some embodiments, first circuitry 510, second circuitry 520, third circuitry 530, and fourth circuitry 540 may be implemented as separate circuitries. In other embodiments, one or more of first circuitry 510, second circuitry 520, third circuitry 530, and fourth circuitry 540 may be combined and implemented together in a circuitry without altering the essence of the embodiments.

Figure 6:
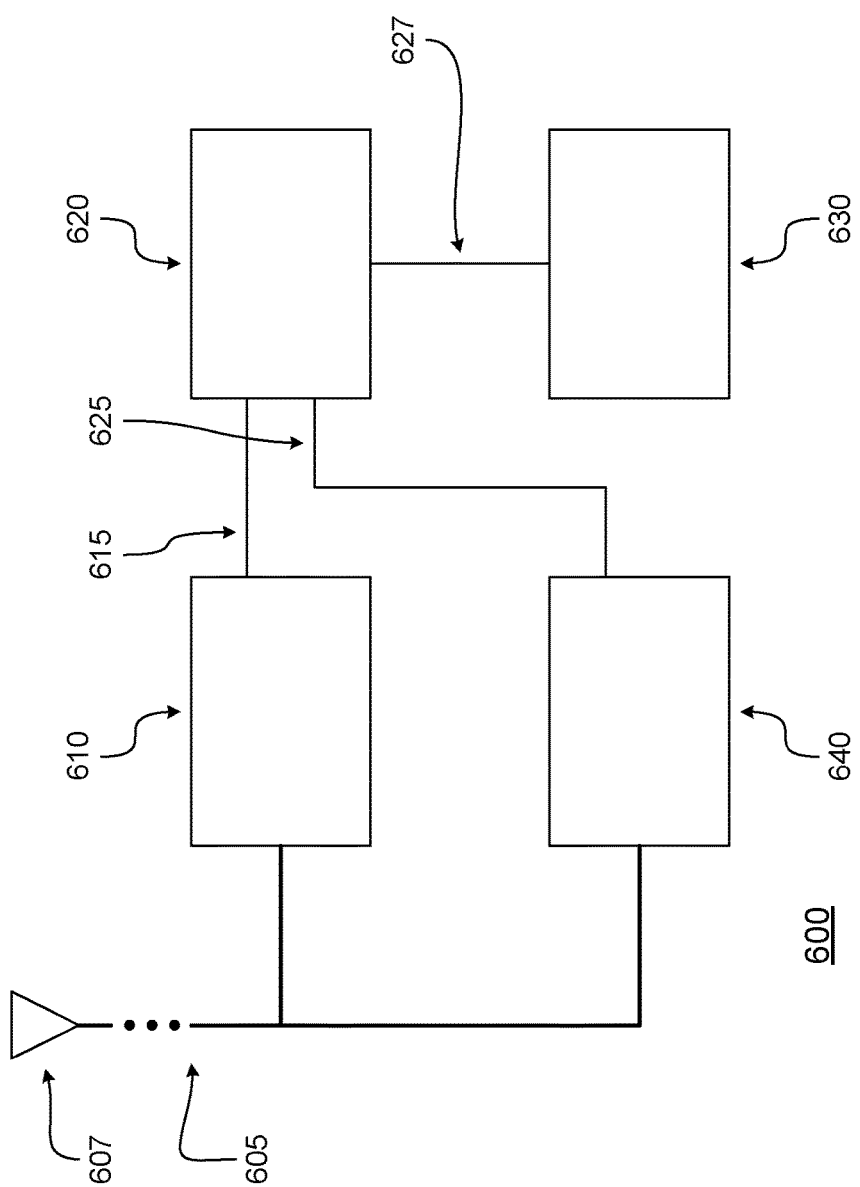
FIG. 6 illustrates hardware processing circuitries for a UE for establishing beamforming hypotheses, in accordance with some embodiments of the disclosure.

FIG. 6 illustrates hardware processing circuitries for a UE for establishing beamforming hypotheses, in accordance with some embodiments of the disclosure. An apparatus of UE 430 (or another UE or mobile handset), which may be operable to communicate with one or more eNBs on a wireless network, may comprise hardware processing circuitry 600. In some embodiments, hardware processing circuitry 600 may comprise one or more antenna ports 605 operable to provide various transmissions over a wireless communication channel (such as wireless communication channel 450). Antenna ports 605 may be coupled to one or more antennas 607 (which may be antennas 425). In some embodiments, hardware processing circuitry 600 may incorporate antennas 607, while in other embodiments, hardware processing circuitry 600 may merely be coupled to antennas 607.

Antenna ports 605 and antennas 607 may be operable to provide signals from a UE to a wireless communications channel and/or an eNB, and may be operable to provide signals from an eNB and/or a wireless communications channel to a UE. For example, antenna ports 605 and antennas 607 may be operable to provide transmissions from UE 430 to wireless communication channel 450 (and from there to eNB 410, or to another eNB). Similarly, antennas 607 and antenna ports 605 may be operable to provide transmissions from a wireless communication channel 450 (and beyond that, from eNB 410, or another eNB) to UE 430.

With reference to FIG. 6, hardware processing circuitry 600 may comprise a first circuitry 610, a second circuitry 620, a third circuitry 630, and a fourth circuitry 640. First circuitry 610 may be operable to process a reference signal transmission for an eNB Tx beam. First circuitry 610 may provide the reference signal transmission to second circuitry 620 via an interface 615. Second circuitry 620 may be operable to determine a first signal reception indication for a first UE antenna port and a second signal reception indication for a second UE antenna port based upon the reference signal transmission. Second circuitry 620 may provide the first signal reception indication and the second signal reception indication to third circuitry 630 via an interface 627, and may provide the first signal reception indication and the second signal reception indication to fourth circuitry 640 via an interface 625. Third circuitry 630 may be operable to establish a transmission hypothesis based upon the first signal reception indication and the second signal reception indication. Fourth circuitry 640 may be operable to generate one or more reporting transmissions carrying at least one of the first signal reception indication for a first UE antenna port and the second signal reception indication for a second UE antenna port.

In some embodiments, the reference signal transmission may comprise one or more BRSes. For some embodiments, the first signal reception indication may comprise a first BRS-RP corresponding with the first UE antenna port, and the second signal reception indication may comprise a second BRS-RP corresponding with the second UE antenna port.

For some embodiments, third circuitry 630 may be operable to calculate a comparison value as being an absolute value of a difference between the first BRS-RP and the second BRS-RP. Third circuitry 630 may also be operable to establish the transmission hypothesis as indicating two UE antenna ports if the comparison value is less than a predetermined threshold value.

In some embodiments, third circuitry 630 may be operable to establish the transmission hypothesis as indicating two UE antenna ports if both the first BRS-RP and the second BRS-RP exceed a predetermined threshold value. For some embodiments, the first signal reception indication may comprise a first CQI, and the second signal reception indication may comprise a second CQI.

For some embodiments, fourth circuitry 640 may be operable to provide an APRI in the one or more reporting transmissions. In some such embodiments, the APRI may be operable to have one or more values indicating whether the first UE antenna port is enabled, and the APRI may be operable to have one or more values indicating whether the second UE antenna port is enabled.

In some embodiments, first circuitry 610 may be operable to process a DCI transmission carrying a BSA indicator. For some embodiments, the BSA indicator may be operable to have one or more values to enable the first UE antenna port, and the BSA indicator may be operable to have one or more values to enable the second UE antenna port.

In some embodiments, first circuitry 610, second circuitry 620, third circuitry 630, and fourth circuitry 640 may be implemented as separate circuitries. In other embodiments, one or more of first circuitry 610, second circuitry 620, third circuitry 630, and fourth circuitry 640 may be combined and implemented together in a circuitry without altering the essence of the embodiments.

FIG. 7 illustrates methods for an eNB for determining beamforming hypotheses, in accordance with some embodiments of the disclosure. A method 700 may comprise a generating 710, a processing 715, a determining 720, a calculating 730, a determining 735, a determining 740, and/or a generating 750.

In generating 710, a reference signal transmission may be generated for an eNB Tx beam corresponding with at least a first eNB antenna port having a first polarization and a second eNB antenna port having a second polarization. In processing 715, one or more reporting transmissions carrying at least one of a first signal reception indication for a first User Equipment (UE) antenna port and a second signal reception indication for a second UE antenna port may be processed. In determining 720, a transmission hypothesis based upon the one or more reporting transmissions may be determined.

In some embodiments, the reference signal transmission may comprise one or more BRSes. For some embodiments, the first signal reception indication may comprise a first BRS-RP corresponding with the first UE antenna port, and the second signal reception indication may comprise a second BRS-RP corresponding with the second UE antenna port.

In calculating 730, a comparison value may be calculated as being an absolute value of a difference between the first BRS-RP and the second BRS-RP. In determining 735, the transmission hypothesis may be determined as indicating two UE antenna ports if the comparison value is less than a predetermined threshold value.

In determining 740, the transmission hypothesis may be determined as indicating two UE antenna ports if both the first BRS-RP and the second BRS-RP exceed a predetermined threshold value.

In some embodiments, the first signal reception indication may comprise a first CQI, and the second signal reception indication may comprise a second CQI. For some embodiments, the one or more reporting transmissions may carry an APRI. In some embodiments, the APRI may be operable to have one or more values indicating whether the first UE antenna port is enabled, and the APRI may be operable to have one or more values indicating whether the second UE antenna port is enabled.

In generating 750, a DCI transmission carrying a BSA indicator may be generated. The BSA indicator may be operable to have one or more values to enable the first UE antenna port, and the BSA indicator may be operable to have one or more values to enable the second UE antenna port.

FIG. 8 illustrates methods for a UE for establishing beamforming hypotheses, in accordance with some embodiments of the disclosure. A method 800 may comprise a processing 810, a determining 815, an establishing 820, a generating 825, a calculating 830, an establishing 835, an establishing 840, a providing 850, and/or a processing 860.

In processing 810, a reference signal transmission for an eNB Tx beam may be processed. In determining 815, a first signal reception indication for a first UE antenna port and a second signal reception indication for a second UE antenna port may be determined based upon the reference signal transmission. In establishing 820, a transmission hypothesis may be established based upon the first signal reception indication and the second signal reception indication. In generating 825, one or more reporting transmissions carrying at least one of the first signal reception indication for a first UE antenna port and the second signal reception indication for a second UE antenna port may be generated.

For some embodiments, the reference signal transmission may comprise one or more BRSes. In some embodiments, the first signal reception indication may comprise a first BRS-RP corresponding with the first UE antenna port, and the second signal reception indication may comprise a second BRS-RP corresponding with the second UE antenna port.

In calculating 830, a comparison value may be calculated as being an absolute value of a difference between the first BRS-RP and the second BRS-RP. In establishing 835, the transmission hypothesis may be established as indicating two UE antenna ports if the comparison value is less than a predetermined threshold value.

In establishing 840, the transmission hypothesis may be established as indicating two UE antenna ports if both the first BRS-RP and the second BRS-RP exceed a predetermined threshold value. In some embodiments, the first signal reception indication may comprise a first CQI, and the second signal reception indication may comprise a second CQI.

In providing 850, an APRI in the one or more reporting transmissions may be provided. In some embodiments, the APRI may be operable to have one or more values indicating whether the first UE antenna port is enabled, and the APRI may be operable to have one or more values indicating whether the second UE antenna port is enabled.

In processing 860, a DCI transmission carrying a BSA indicator may be processed. The BSA indicator may be operable to have one or more values to enable the first UE antenna port, and the BSA indicator may be operable to have one or more values to enable the second UE antenna port.

Figure 9:
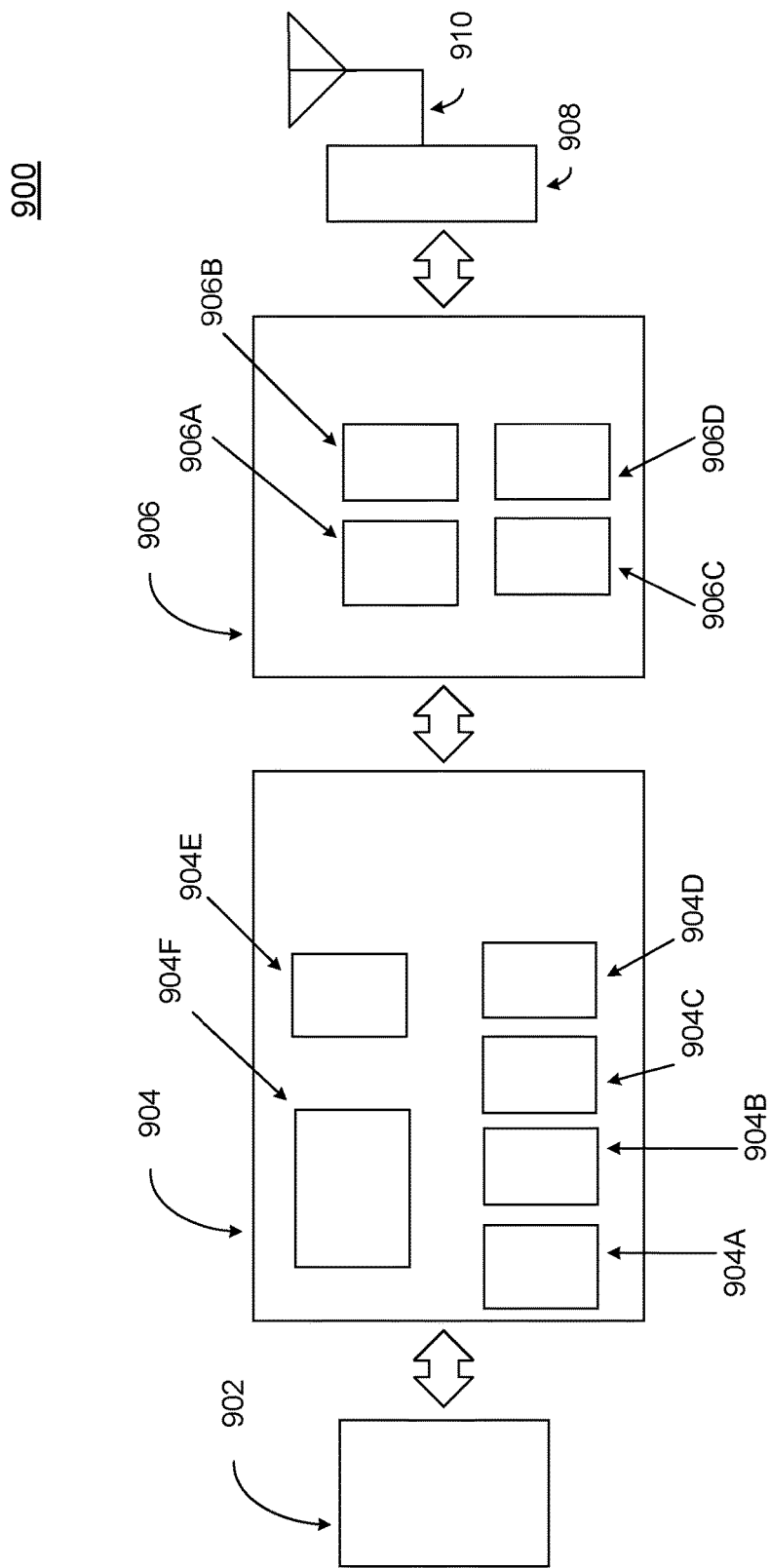
FIG. 9 illustrates example components of a UE device, in accordance with some embodiments of the disclosure.

FIG. 9 illustrates example components of a UE device, in accordance with some embodiments of the disclosure. In some embodiments, the UE device 900 may include application circuitry 902, baseband circuitry 904, Radio Frequency (RF) circuitry 906, front-end module (FEM) circuitry 908, a low-power wake-up receiver (LP-WUR), and one or more antennas 910, coupled together at least as shown. In some embodiments, the UE device 900 may include additional elements such as, for example, memory/storage, display, camera, sensor, and/or input/output (I/O) interface.

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 904 may include circuitry such as, but not limited to, one or more single-core or multi-core processors. The baseband circuitry 904 may include one or more baseband processors and/or control logic to process baseband signals received from a receive signal path of the RF circuitry 906 and to generate baseband signals for a transmit signal path of the RF circuitry 906. Baseband processing circuitry 904 may interface with the application circuitry 902 for generation and processing of the baseband signals and for controlling operations of the RF circuitry 906. For example, in some embodiments, the baseband circuitry 904 may include a second generation (2G) baseband processor 904A, third generation (3G) baseband processor 904B, fourth generation (4G) baseband processor 904C, and/or other baseband processor(s) 904D for other existing generations, generations in development or to be developed in the future (e.g., fifth generation (5G), 6G, etc.). The baseband circuitry 904 (e.g., one or more of baseband processors 904A-D) may handle various radio control functions that enable communication with one or more radio networks via the RF circuitry 906. The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, and/or constellation mapping/demapping functionality. In some embodiments, encoding/decoding circuitry of the baseband circuitry 904 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include elements of a protocol stack such as, for example, elements of an EUTRAN protocol including, for example, physical (PHY), media access control (MAC), radio link control (RLC), packet data convergence protocol (PDCP), and/or RRC elements. A central processing unit (CPU) 904E of the baseband circuitry 904 may be configured to run elements of the protocol stack for signaling of the PHY, MAC, RLC, PDCP and/or RRC layers. In some embodiments, the baseband circuitry may include one or more audio digital signal processor(s) (DSP) 904F. The audio DSP(s) 904F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 904 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the RF circuitry 906 may include a receive signal path and a transmit signal path. The receive signal path of the RF circuitry 906 may include mixer circuitry 906A, amplifier circuitry 906B and filter circuitry 906C. The transmit signal path of the RF circuitry 906 may include filter circuitry 906C and mixer circuitry 906A. RF circuitry 906 may also include synthesizer circuitry 906D for synthesizing a frequency for use by the mixer circuitry 906A of the receive signal path and the transmit signal path. In some embodiments, the mixer circuitry 906A of the receive signal path may be configured to down-convert RF signals received from the FEM circuitry 908 based on the synthesized frequency provided by synthesizer circuitry 906D. The amplifier circuitry 906B may be configured to amplify the down-converted signals and the filter circuitry 906C may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, mixer circuitry 906A of the receive signal path may comprise passive mixers, although the scope of the embodiments is not limited in this respect.

In some embodiments, the mixer circuitry 906A of the transmit signal path may be configured to up-convert input baseband signals based on the synthesized frequency provided by the synthesizer circuitry 906D to generate RF output signals for the FEM circuitry 908. The baseband signals may be provided by the baseband circuitry 904 and may be filtered by filter circuitry 906C. The filter circuitry 906C may include a low-pass filter (LPF), although the scope of the embodiments is not limited in this respect.

In some embodiments, the mixer circuitry 906A of the receive signal path and the mixer circuitry 906A of the transmit signal path may include two or more mixers and may be arranged for quadrature down-conversion and/or up-conversion respectively. In some embodiments, the mixer circuitry 906A of the receive signal path and the mixer circuitry 906A of the transmit signal path may include two or more mixers and may be arranged for image rejection (e.g., Hartley image rejection). In some embodiments, the mixer circuitry 906A of the receive signal path and the mixer circuitry 906A may be arranged for direct down-conversion and/or direct up-conversion, respectively. In some embodiments, the mixer circuitry 906A of the receive signal path and the mixer circuitry 906A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906D may be a fractional-N synthesizer or a fractional N/N+1 synthesizer, although the scope of the embodiments is not limited in this respect as other types of frequency synthesizers may be suitable. For example, synthesizer circuitry 906D may be a delta-sigma synthesizer, a frequency multiplier, or a synthesizer comprising a phase-locked loop with a frequency divider.

The synthesizer circuitry 906D may be configured to synthesize an output frequency for use by the mixer circuitry 906A of the RF circuitry 906 based on a frequency input and a divider control input. In some embodiments, the synthesizer circuitry 906D may be a fractional N/N+1 synthesizer.

In some embodiments, frequency input may be provided by a voltage controlled oscillator (VCO), although that is not a requirement. Divider control input may be provided by either the baseband circuitry 904 or the applications processor 902 depending on the desired output frequency. In some embodiments, a divider control input (e.g., N) may be determined from a look-up table based on a channel indicated by the applications processor 902.

Synthesizer circuitry 906D of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 910.

In some embodiments, the FEM circuitry 908 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 910.

In some embodiments, the UE 900 comprises a plurality of power saving mechanisms. If the UE 900 is in an RRC_Connected state, where it is still connected to the eNB as it expects to receive traffic shortly, then it may enter a state known as Discontinuous Reception Mode (DRX) after a period of inactivity. During this state, the device may power down for brief intervals of time and thus save power.

If there is no data traffic activity for an extended period of time, then the UE 900 may transition off to an RRC_Idle state, where it disconnects from the network and does not perform operations such as channel quality feedback, handover, etc. The UE 900 goes into a very low power state and it performs paging where again it periodically wakes up to listen to the network and then powers down again. Since the device might not receive data in this state, in order to receive data, it should transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 provides an apparatus of an Evolved Node B (eNB) operable to communicate with a User Equipment (UE) on a wireless network, comprising: one or more processors to: generate a reference signal transmission for an eNB Transmitting (Tx) beam corresponding with at least a first eNB antenna port having a first polarization and a second eNB antenna port having a second polarization; process one or more reporting transmissions carrying at least one of a first signal reception indication for a first UE antenna port and a second signal reception indication for a second UE antenna port; and determine a transmission hypothesis based upon the one or more reporting transmissions, wherein the transmission hypothesis has one of: a first value corresponding with one UE antenna port, or a second value corresponding with two UE antenna ports.

In example 2, the apparatus of example 1, wherein the reference signal transmission comprises one or more Beam Reference Signals (BRSes); wherein the first signal reception indication comprises a first BRS Receiving Power (BRS-RP) corresponding with the first UE antenna port; and wherein the second signal reception indication comprises a second BRS-RP corresponding with the second UE antenna port.

In example 3, the apparatus of example 2, wherein the one or more processors are further to: calculate a comparison value as being an absolute value of a difference between the first BRS-RP and the second BRS-RP; and determine the transmission hypothesis as indicating two UE antenna ports if the comparison value is less than a predetermined threshold value.

In example 4, the apparatus of either of examples 1 or 2, wherein the one or more processors are further to: determine the transmission hypothesis as indicating two UE antenna ports if both the first BRS-RP and the second BRS-RP exceed a predetermined threshold value.

In example 5, the apparatus of any of examples 1 through 4, wherein the first signal reception indication comprises a first Channel Quality Indicator (CQI); and wherein the second signal reception indication comprises a second CQI.

In example 6, the apparatus of example 5, wherein the one or more reporting transmissions carry an Antenna Port and Rank Indicator (APRI), wherein the APRI is operable to have one or more values indicating whether the first UE antenna port is enabled, and wherein the APRI is operable to have one or more values indicating whether the second UE antenna port is enabled.

In example 7, the apparatus of any of examples 1 through 6, wherein the one or more processors are further to: generate a Downlink Control Information (DCI) transmission carrying a Beam Search Algorithm (BSA) indicator, wherein the BSA indicator is operable to have one or more values to enable the first UE antenna port; and wherein the BSA indicator is operable to have one or more values to enable the second UE antenna port.

In example 8, the apparatus of any of examples 1 through 7, wherein, if the transmission hypothesis indicates one antenna port, the eNB may transmit to the UE, with the first polarization, one of: a plurality of odd Control Channel Elements (CCEs), or a plurality of even CCEs.

Example 9 provides an Evolved Node B (eNB) device comprising an application processor, a memory, one or more antenna ports, and an interface for allowing the application processor to communicate with another device, the eNB device including the apparatus of any of examples 1 through 8.

Example 10 provides a method comprising: generating, for an Evolved Node B (eNB), a reference signal transmission for an eNB Transmitting (Tx) beam corresponding with at least a first eNB antenna port having a first polarization and a second eNB antenna port having a second polarization; processing one or more reporting transmissions carrying at least one of a first signal reception indication for a first User Equipment (UE) antenna port and a second signal reception indication for a second UE antenna port; and determining a transmission hypothesis based upon the one or more reporting transmissions, wherein the transmission hypothesis has one of: a first value corresponding with one UE antenna port, or a second value corresponding with two UE antenna ports.

In example 11, the method of example 10, wherein the reference signal transmission comprises one or more Beam Reference Signals (BRSes); wherein the first signal reception indication comprises a first BRS Receiving Power (BRS-RP) corresponding with the first UE antenna port; and wherein the second signal reception indication comprises a second BRS-RP corresponding with the second UE antenna port.

In example 12, the method of example 11, the operation comprising: calculating a comparison value as being an absolute value of a difference between the first BRS-RP and the second BRS-RP; and determining the transmission hypothesis as indicating two UE antenna ports if the comparison value is less than a predetermined threshold value.

In example 13, the method of either of examples 10 or 11, the operation comprising: determine the transmission hypothesis as indicating two UE antenna ports if both the first BRS-RP and the second BRS-RP exceed a predetermined threshold value.

In example 14, the method of any of examples 10 through 13, wherein the first signal reception indication comprises a first Channel Quality Indicator (CQI); and wherein the second signal reception indication comprises a second CQI.

In example 15, the method of example 14, wherein the one or more reporting transmissions carry an Antenna Port and Rank Indicator (APRI), wherein the APRI is operable to have one or more values indicating whether the first UE antenna port is enabled, and wherein the APRI is operable to have one or more values indicating whether the second UE antenna port is enabled.

In example 16, the method of any of examples 10 through 15, the operation comprising: generating a Downlink Control Information (DCI) transmission carrying a Beam Search Algorithm (BSA) indicator, wherein the BSA indicator is operable to have one or more values to enable the first UE antenna port; and wherein the BSA indicator is operable to have one or more values to enable the second UE antenna port.

In example 17, the method of any of examples 10 through 16, wherein, if the transmission hypothesis indicates one antenna port, the eNB may transmit to the UE, with the first polarization, one of: a plurality of odd Control Channel Elements (CCEs), or a plurality of even CCEs.

Example 18 provides machine readable storage media having machine executable instructions stored thereon that, when executed, cause one or more processors to perform a method according to any of examples 10 through 17.

Example 19 provides an apparatus of an Evolved Node B (eNB) operable to communicate with a User Equipment (UE) on a wireless network, method comprising: means for generating, for an Evolved Node B (eNB), a reference signal transmission for an eNB Transmitting (Tx) beam corresponding with at least a first eNB antenna port having a first polarization and a second eNB antenna port having a second polarization; means for processing one or more reporting transmissions carrying at least one of a first signal reception indication for a first User Equipment (UE) antenna port and a second signal reception indication for a second UE antenna port; and means for determining a transmission hypothesis based upon the one or more reporting transmissions, wherein the transmission hypothesis has one of: a first value corresponding with one UE antenna port, or a second value corresponding with two UE antenna ports.

In example 20, the apparatus of example 19, wherein the reference signal transmission comprises one or more Beam Reference Signals (BRSes); wherein the first signal reception indication comprises a first BRS Receiving Power (BRS-RP) corresponding with the first UE antenna port; and wherein the second signal reception indication comprises a second BRS-RP corresponding with the second UE antenna port.

In example 21, the apparatus of example 20, the operation comprising: means for calculating a comparison value as being an absolute value of a difference between the first BRS-RP and the second BRS-RP; and means for determining the transmission hypothesis as indicating two UE antenna ports if the comparison value is less than a predetermined threshold value.

In example 22, the apparatus of either of examples 19 or 20, the operation comprising: means for determine the transmission hypothesis as indicating two UE antenna ports if both the first BRS-RP and the second BRS-RP exceed a predetermined threshold value.

In example 23, the apparatus of any of examples 19 through 22, wherein the first signal reception indication comprises a first Channel Quality Indicator (CQI); and wherein the second signal reception indication comprises a second CQI.

In example 24, the apparatus of example 23, wherein the one or more reporting transmissions carry an Antenna Port and Rank Indicator (APRI), wherein the APRI is operable to have one or more values indicating whether the first UE antenna port is enabled, and wherein the APRI is operable to have one or more values indicating whether the second UE antenna port is enabled.

In example 25, the apparatus of any of examples 19 through 24, the operation comprising: means for generating a Downlink Control Information (DCI) transmission carrying a Beam Search Algorithm (BSA) indicator, wherein the BSA indicator is operable to have one or more values to enable the first UE antenna port; and wherein the BSA indicator is operable to have one or more values to enable the second UE antenna port.

In example 26, the apparatus of any of examples 19 through 25, wherein, if the transmission hypothesis indicates one antenna port, the eNB may transmit to the UE, with the first polarization, one of: a plurality of odd Control Channel Elements (CCEs), or a plurality of even CCEs.

Example 27 provides machine readable storage media having machine executable instructions that, when executed, cause one or more processors to perform an operation comprising: generate, for an Evolved Node B (eNB), a reference signal transmission for an eNB Transmitting (Tx) beam corresponding with at least a first eNB antenna port having a first polarization and a second eNB antenna port having a second polarization; process one or more reporting transmissions carrying at least one of a first signal reception indication for a first User Equipment (UE) antenna port and a second signal reception indication for a second UE antenna port; and determine a transmission hypothesis based upon the one or more reporting transmissions, wherein the transmission hypothesis has one of: a first value corresponding with one UE antenna port, or a second value corresponding with two UE antenna ports.

In example 28, the machine readable storage media of example 27, wherein the reference signal transmission comprises one or more Beam Reference Signals (BRSes); wherein the first signal reception indication comprises a first BRS Receiving Power (BRS-RP) corresponding with the first UE antenna port; and wherein the second signal reception indication comprises a second BRS-RP corresponding with the second UE antenna port.

In example 29, the machine readable storage media of example 28, the operation comprising: calculate a comparison value as being an absolute value of a difference between the first BRS-RP and the second BRS-RP; and determine the transmission hypothesis as indicating two UE antenna ports if the comparison value is less than a predetermined threshold value.

In example 30, the machine readable storage media of either of examples 27 or 28, the operation comprising: determine the transmission hypothesis as indicating two UE antenna ports if both the first BRS-RP and the second BRS-RP exceed a predetermined threshold value.

In example 31, the machine readable storage media of any of examples 27 through 30, wherein the first signal reception indication comprises a first Channel Quality Indicator (CQI); and wherein the second signal reception indication comprises a second CQI.

In example 32, the machine readable storage media of example 31, wherein the one or more reporting transmissions carry an Antenna Port and Rank Indicator (APRT), wherein the APRI is operable to have one or more values indicating whether the first UE antenna port is enabled, and wherein the APRI is operable to have one or more values indicating whether the second UE antenna port is enabled.

In example 33, the machine readable storage media of any of examples 27 through 32, the operation comprising: generate a Downlink Control Information (DCI) transmission carrying a Beam Search Algorithm (BSA) indicator, wherein the BSA indicator is operable to have one or more values to enable the first UE antenna port; and wherein the BSA indicator is operable to have one or more values to enable the second UE antenna port.

In example 34, the machine readable storage media of any of examples 27 through 33, wherein, if the transmission hypothesis indicates one antenna port, the eNB may transmit to the UE, with the first polarization, one of: a plurality of odd Control Channel Elements (CCEs), or a plurality of even CCEs.

Example 35 provides an apparatus of a User Equipment (UE) operable to communicate with an Evolved Node B (eNB) on a wireless network, comprising: one or more processors to: process a reference signal transmission for an eNB Transmitting (Tx) beam; determine a first signal reception indication for a first UE antenna port and a second signal reception indication for a second UE antenna port based upon the reference signal transmission; establish a transmission hypothesis based upon the first signal reception indication and the second signal reception indication; and generate one or more reporting transmissions carrying at least one of the first signal reception indication for a first UE antenna port and the second signal reception indication for a second UE antenna port, wherein the transmission hypothesis has one of: a first value corresponding with one UE antenna port, or a second value corresponding with two UE antenna ports.

In example 36, the apparatus of example 35, wherein the reference signal transmission comprises one or more Beam Reference Signals (BRSes); wherein the first signal reception indication comprises a first BRS Receiving Power (BRS-RP) corresponding with the first UE antenna port; and wherein the second signal reception indication comprises a second BRS-RP corresponding with the second UE antenna port.

In example 37, the apparatus of example 36, wherein the one or more processors are further to: calculate a comparison value as being an absolute value of a difference between the first BRS-RP and the second BRS-RP; and establish the transmission hypothesis as indicating two UE antenna ports if the comparison value is less than a predetermined threshold value.

In example 38, the apparatus of either of examples 35 or 36, wherein the one or more processors are further to: establish the transmission hypothesis as indicating two UE antenna ports if both the first BRS-RP and the second BRS-RP exceed a predetermined threshold value.

In example 39, the apparatus of any of examples 35 through 38, wherein the one or more processors are further to: wherein the first signal reception indication comprises a first Channel Quality Indicator (CQI); and wherein the second signal reception indication comprises a second CQI.

In example 40, the apparatus of example 39, wherein the one or more processors are further to: provide an Antenna Port and Rank Indicator (APRI) in the one or more reporting transmissions, wherein the APRI is operable to have one or more values indicating whether the first UE antenna port is enabled, and wherein the APRI is operable to have one or more values indicating whether the second UE antenna port is enabled.

In example 41, the apparatus of any of examples 35 through 40, wherein the one or more processors are further to: process a Downlink Control Information (DCI) transmission carrying a Beam Search Algorithm (BSA) indicator, wherein the BSA indicator is operable to have one or more values to enable the first UE antenna port; and wherein the BSA indicator is operable to have one or more values to enable the second UE antenna port.

In example 42, the apparatus of any of examples 35 through 41, wherein, if the transmission hypothesis indicates one antenna port, the UE may search one of: a plurality of odd Control Channel Elements (CCEs), or a plurality of even CCEs.

Example 43 provides a User Equipment (UE) device comprising an application processor, a memory, one or more antennas, a wireless interface for allowing the application processor to communicate with another device, and a touchscreen display, the UE device including the apparatus of any of examples 35 through 42.

Example 44 provides a method comprising: processing, for a User Equipment (UE), a reference signal transmission for an Evolved Node-B (eNB) Transmitting (Tx) beam; determining a first signal reception indication for a first UE antenna port and a second signal reception indication for a second UE antenna port based upon the reference signal transmission; establishing a transmission hypothesis based upon the first signal reception indication and the second signal reception indication; and generating one or more reporting transmissions carrying at least one of the first signal reception indication for a first UE antenna port and the second signal reception indication for a second UE antenna port, wherein the transmission hypothesis has one of: a first value corresponding with one UE antenna port, or a second value corresponding with two UE antenna ports.

In example 45, the method of example 44, wherein the reference signal transmission comprises one or more Beam Reference Signals (BRSes); wherein the first signal reception indication comprises a first BRS Receiving Power (BRS-RP) corresponding with the first UE antenna port; and wherein the second signal reception indication comprises a second BRS-RP corresponding with the second UE antenna port.

In example 46, the method of example 45, the operation comprising: calculating a comparison value as being an absolute value of a difference between the first BRS-RP and the second BRS-RP; and establish the transmission hypothesis as indicating two UE antenna ports if the comparison value is less than a predetermined threshold value.

In example 47, the method of either of examples 44 or 45, the operation comprising: establishing the transmission hypothesis as indicating two UE antenna ports if both the first BRS-RP and the second BRS-RP exceed a predetermined threshold value.

In example 48, the method of any of examples 44 through 47, the operation comprising: wherein the first signal reception indication comprises a first Channel Quality Indicator (CQI); and wherein the second signal reception indication comprises a second CQI.

In example 49, the method of example 48, the operation comprising: providing an Antenna Port and Rank Indicator (APRT) in the one or more reporting transmissions, wherein the APRI is operable to have one or more values indicating whether the first UE antenna port is enabled, and wherein the APRI is operable to have one or more values indicating whether the second UE antenna port is enabled.

In example 50, the method of any of examples 44 through 49, the operation comprising: processing a Downlink Control Information (DCI) transmission carrying a Beam Search Algorithm (BSA) indicator, wherein the BSA indicator is operable to have one or more values to enable the first UE antenna port; and wherein the BSA indicator is operable to have one or more values to enable the second UE antenna port.

In example 51, the method of any of examples 44 through 50, wherein, if the transmission hypothesis indicates one antenna port, the UE may search one of: a plurality of odd Control Channel Elements (CCEs), or a plurality of even CCEs.

Example 52 provides machine readable storage media having machine executable instructions stored thereon that, when executed, cause one or more processors to perform a method according to any of examples 44 through 51.

Example 53 provides an apparatus of a User Equipment (UE) operable to communicate with an Evolved Node B (eNB) on a wireless network, comprising: means for processing, for a User Equipment (UE), a reference signal transmission for an Evolved Node-B (eNB) Transmitting (Tx) beam; means for determining a first signal reception indication for a first UE antenna port and a second signal reception indication for a second UE antenna port based upon the reference signal transmission; means for establishing a transmission hypothesis based upon the first signal reception indication and the second signal reception indication; and means for generating one or more reporting transmissions carrying at least one of the first signal reception indication for a first UE antenna port and the second signal reception indication for a second UE antenna port, wherein the transmission hypothesis has one of: a first value corresponding with one UE antenna port, or a second value corresponding with two UE antenna ports.

In example 54, the apparatus of example 53, wherein the reference signal transmission comprises one or more Beam Reference Signals (BRSes); wherein the first signal reception indication comprises a first BRS Receiving Power (BRS-RP) corresponding with the first UE antenna port; and wherein the second signal reception indication comprises a second BRS-RP corresponding with the second UE antenna port.

In example 55, the apparatus of example 54, the operation comprising: means for calculating a comparison value as being an absolute value of a difference between the first BRS-RP and the second BRS-RP; and means for establish the transmission hypothesis as indicating two UE antenna ports if the comparison value is less than a predetermined threshold value.

In example 56, the apparatus of either of examples 53 or 54, the operation comprising: means for establishing the transmission hypothesis as indicating two UE antenna ports if both the first BRS-RP and the second BRS-RP exceed a predetermined threshold value.

In example 57, the apparatus of any of examples 53 through 56, the operation comprising: wherein the first signal reception indication comprises a first Channel Quality Indicator (CQI); and wherein the second signal reception indication comprises a second CQI.

In example 58, the apparatus of example 57, the operation comprising: means for providing an Antenna Port and Rank Indicator (APRI) in the one or more reporting transmissions, wherein the APRI is operable to have one or more values indicating whether the first UE antenna port is enabled, and wherein the APRI is operable to have one or more values indicating whether the second UE antenna port is enabled.

In example 59, the apparatus of any of examples 53 through 58, the operation comprising: means for processing a Downlink Control Information (DCI) transmission carrying a Beam Search Algorithm (BSA) indicator, wherein the BSA indicator is operable to have one or more values to enable the first UE antenna port; and wherein the BSA indicator is operable to have one or more values to enable the second UE antenna port.

In example 60, the method of any of examples 53 through 59, wherein, if the transmission hypothesis indicates one antenna port, the UE may search one of: a plurality of odd Control Channel Elements (CCEs), or a plurality of even CCEs.

Example 61 provides machine readable storage media having machine executable instructions that, when executed, cause one or more processors to perform an operation comprising: process, for a User Equipment (UE), a reference signal transmission for an Evolved Node-B (eNB) Transmitting (Tx) beam; determine a first signal reception indication for a first UE antenna port and a second signal reception indication for a second UE antenna port based upon the reference signal transmission; establish a transmission hypothesis based upon the first signal reception indication and the second signal reception indication; and generate one or more reporting transmissions carrying at least one of the first signal reception indication for a first UE antenna port and the second signal reception indication for a second UE antenna port, wherein the transmission hypothesis has one of: a first value corresponding with one UE antenna port, or a second value corresponding with two UE antenna ports.

In example 62, the machine readable storage media of example 61, wherein the reference signal transmission comprises one or more Beam Reference Signals (BRSes); wherein the first signal reception indication comprises a first BRS Receiving Power (BRS-RP) corresponding with the first UE antenna port; and wherein the second signal reception indication comprises a second BRS-RP corresponding with the second UE antenna port.

In example 63, the machine readable storage media of example 62, the operation comprising: calculate a comparison value as being an absolute value of a difference between the first BRS-RP and the second BRS-RP; and establish the transmission hypothesis as indicating two UE antenna ports if the comparison value is less than a predetermined threshold value.

In example 64, the machine readable storage media of either of examples 61 or 62, the operation comprising: establish the transmission hypothesis as indicating two UE antenna ports if both the first BRS-RP and the second BRS-RP exceed a predetermined threshold value.

In example 65, the machine readable storage media of any of examples 61 through 64, the operation comprising: wherein the first signal reception indication comprises a first Channel Quality Indicator (CQI); and wherein the second signal reception indication comprises a second CQI.

In example 66, the machine readable storage media of example 65, the operation comprising: provide an Antenna Port and Rank Indicator (APRI) in the one or more reporting transmissions, wherein the APRI is operable to have one or more values indicating whether the first UE antenna port is enabled, and wherein the APRI is operable to have one or more values indicating whether the second UE antenna port is enabled.

In example 67, the machine readable storage media of any of examples 61 through 66, the operation comprising: process a Downlink Control Information (DCI) transmission carrying a Beam Search Algorithm (BSA) indicator, wherein the BSA indicator is operable to have one or more values to enable the first UE antenna port; and wherein the BSA indicator is operable to have one or more values to enable the second UE antenna port.

In example 68, the machine readable storage media of any of examples 61 through 67, wherein, if the transmission hypothesis indicates one antenna port, the UE may search one of: a plurality of odd Control Channel Elements (CCEs), or a plurality of even CCEs.

In example 69, the apparatus of any of examples 1 through 8, 19 through 26, 35 through 42, and 53 through 59, wherein the one more processors comprise a baseband processor.

In example 70, the apparatus of any of examples 1 through 8, 19 through 26, 35 through 42, and 53 through 59, comprising a transceiver circuitry to generate transmissions and to process transmissions.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus of an Evolved Node-B (eNB) operable to communicate with a User Equipment (UE) on a wireless network, comprising:
   one or more processors to:
   generate a reference signal transmission for an eNB Transmitting (Tx) beam corresponding with at least a first eNB antenna port having a first polarization and a second eNB antenna port having a second polarization;
   process one or more reporting transmissions carrying at least one of a first signal reception indication for a first UE antenna port and a second signal reception indication for a second UE antenna port; and
   determine a transmission hypothesis based upon the one or more reporting transmissions,
   wherein the transmission hypothesis has one of: a first value corresponding with one UE antenna port, or a second value corresponding with two UE antenna ports.

2. The apparatus of claim 1,
   wherein the reference signal transmission comprises one or more Beam Reference Signals (BRSes);
   wherein the first signal reception indication comprises a first BRS Receiving Power (BRS-RP) corresponding with the first UE antenna port; and
   wherein the second signal reception indication comprises a second BRS-RP corresponding with the second UE antenna port.

3. The apparatus of claim 2, wherein the one or more processors are further to:
   calculate a comparison value as being an absolute value of a difference between the first BRS-RP and the second BRS-RP; and
   determine the transmission hypothesis as indicating two UE antenna ports if the comparison value is less than a predetermined threshold value.

4. The apparatus of claim 1, wherein the one or more processors are further to:
   determine the transmission hypothesis as indicating two UE antenna ports if both the first BRS-RP and the second BRS-RP exceed a predetermined threshold value.

5. The apparatus of claim 1,
   wherein the first signal reception indication comprises a first Channel Quality Indicator (CQI); and
   wherein the second signal reception indication comprises a second CQI.

6. The apparatus of claim 5,
wherein the one or more reporting transmissions carry an Antenna Port and Rank Indicator (APRI),
wherein the APRI is operable to have one or more values indicating whether the first UE antenna port is enabled, and
wherein the APRI is operable to have one or more values indicating whether the second UE antenna port is enabled.

7. Machine readable non-transitory storage media having machine executable instructions that, when executed, cause one or more processors to perform an operation comprising:
generate, for an Evolved Node-B (eNB), a reference signal transmission for an eNB Transmitting (Tx) beam corresponding with at least a first eNB antenna port having a first polarization and a second eNB antenna port having a second polarization;
process one or more reporting transmissions carrying at least one of a first signal reception indication for a first User Equipment (UE) antenna port and a second signal reception indication for a second UE antenna port; and
determine a transmission hypothesis based upon the one or more reporting transmissions,
wherein the transmission hypothesis has one of: a first value corresponding with one UE antenna port, or a second value corresponding with two UE antenna ports.

8. The machine readable non-transitory storage media of claim 7,
wherein the reference signal transmission comprises one or more Beam Reference Signals (BRSes);
wherein the first signal reception indication comprises a first BRS Receiving Power (BRS-RP) corresponding with the first UE antenna port; and
wherein the second signal reception indication comprises a second BRS-RP corresponding with the second UE antenna port.

9. The machine readable non-transitory storage media of claim 8, the operation comprising:
calculate a comparison value as being an absolute value of a difference between the first BRS-RP and the second BRS-RP; and
determine the transmission hypothesis as indicating two UE antenna ports if the comparison value is less than a predetermined threshold value.

10. The machine readable non-transitory storage media of claim 7, the operation comprising:
determine the transmission hypothesis as indicating two UE antenna ports if both the first BRS-RP and the second BRS-RP exceed a predetermined threshold value.

11. The machine readable non-transitory storage media of claim 7,
wherein the first signal reception indication comprises a first Channel Quality Indicator (CQI); and
wherein the second signal reception indication comprises a second CQI.

12. The machine readable non-transitory storage media of claim 11,
wherein the one or more reporting transmissions carry an Antenna Port and Rank Indicator (APRI),
wherein the APRI is operable to have one or more values indicating whether the first UE antenna port is enabled, and
wherein the APRI is operable to have one or more values indicating whether the second UE antenna port is enabled.

13. An apparatus of a User Equipment (UE) operable to communicate with an Evolved Node-B (eNB) on a wireless network, comprising:
one or more processors to:
process a reference signal transmission for an eNB Transmitting (Tx) beam;
determine a first signal reception indication for a first UE antenna port and a second signal reception indication for a second UE antenna port based upon the reference signal transmission;
establish a transmission hypothesis based upon the first signal reception indication and the second signal reception indication; and
generate one or more reporting transmissions carrying at least one of the first signal reception indication for a first UE antenna port and the second signal reception indication for a second UE antenna port,
wherein the transmission hypothesis has one of: a first value corresponding with one UE antenna port, or a second value corresponding with two UE antenna ports.

14. The apparatus of claim 13,
wherein the reference signal transmission comprises one or more Beam Reference Signals (BRSes);
wherein the first signal reception indication comprises a first BRS Receiving Power (BRS-RP) corresponding with the first UE antenna port; and
wherein the second signal reception indication comprises a second BRS-RP corresponding with the second UE antenna port.

15. The apparatus of claim 14, wherein the one or more processors are further to:
calculate a comparison value as being an absolute value of a difference between the first BRS-RP and the second BRS-RP; and
establish the transmission hypothesis as indicating two UE antenna ports if the comparison value is less than a predetermined threshold value.

16. The apparatus of claim 13, wherein the one or more processors are further to:
establish the transmission hypothesis as indicating two UE antenna ports if both the first BRS-RP and the second BRS-RP exceed a predetermined threshold value.

17. The apparatus of claim 13, wherein the one or more processors are further to:
wherein the first signal reception indication comprises a first Channel Quality Indicator (CQI); and
wherein the second signal reception indication comprises a second CQI.

18. The apparatus of claim 17, wherein the one or more processors are further to:
provide an Antenna Port and Rank Indicator (APRI) in the one or more reporting transmissions,
wherein the APRI is operable to have one or more values indicating whether the first UE antenna port is enabled, and
wherein the APRI is operable to have one or more values indicating whether the second UE antenna port is enabled.

19. Machine readable non-transitory storage media having machine executable instructions that, when executed, cause one or more processors to perform an operation comprising:
process, for a User Equipment (UE), a reference signal transmission for an Evolved Node-B (eNB) Transmitting (Tx) beam;

determine a first signal reception indication for a first UE antenna port and a second signal reception indication for a second UE antenna port based upon the reference signal transmission;

establish a transmission hypothesis based upon the first signal reception indication and the second signal reception indication; and generate one or more reporting transmissions carrying at least one of the first signal reception indication for a first UE antenna port and the second signal reception indication for a second UE antenna port, wherein the transmission hypothesis has one of: a first value corresponding with one UE antenna port, or a second value corresponding with two UE antenna ports.

20. The machine readable non-transitory storage media of claim 19, wherein the reference signal transmission comprises one or more Beam Reference Signals (BRSes);

wherein the first signal reception indication comprises a first BRS Receiving Power (BRS-RP) corresponding with the first UE antenna port; and wherein the second signal reception indication comprises a second BRS-RP corresponding with the second UE antenna port.

21. The machine readable non-transitory storage media of claim 20, the operation comprising:

calculate a comparison value as being an absolute value of a difference between the first BRS-RP and the second BRS-RP; and establish the transmission hypothesis as indicating two UE antenna ports if the comparison value is less than a predetermined threshold value.

22. The machine readable non-transitory storage media of claim 19, the operation comprising:

establish the transmission hypothesis as indicating two UE antenna ports if both the first BRS-RP and the second BRS-RP exceed a predetermined threshold value.

23. The machine readable non-transitory storage media of claim 19, the operation comprising:

wherein the first signal reception indication comprises a first Channel Quality Indicator (CQI); and wherein the second signal reception indication comprises a second CQI.

24. The machine readable non-transitory storage media of claim 23, the operation comprising:

provide an Antenna Port and Rank Indicator (APRI) in the one or more reporting transmissions, wherein the APRI is operable to have one or more values indicating whether the first UE antenna port is enabled, and wherein the APRI is operable to have one or more values indicating whether the second UE antenna port is enabled.

* * * * *